(12) United States Patent
Jarvis

(10) Patent No.: US 7,414,979 B1
(45) Date of Patent: Aug. 19, 2008

(54) METHOD AND APPARATUS FOR PER SESSION LOAD BALANCING WITH IMPROVED LOAD SHARING IN A PACKET SWITCHED NETWORK

(75) Inventor: Neil Alasdair James Jarvis, Edinburgh (GB)

(73) Assignee: Cisco Technology, Inc., San Jose, CA (US)

(*) Notice: Subject to any disclaimer, the term of this patent is extended or adjusted under 35 U.S.C. 154(b) by 139 days.

(21) Appl. No.: 11/441,570

(22) Filed: May 26, 2006

Related U.S. Application Data

(60) Division of application No. 11/242,517, filed on Oct. 3, 2005, now Pat. No. 7,233,575, which is a continuation of application No. 09/727,098, filed on Nov. 29, 2000, now Pat. No. 6,980,521.

(51) Int. Cl.
*H04J 1/16* (2006.01)
*H04L 12/56* (2006.01)

(52) U.S. Cl. .................. 370/238; 370/386; 711/216; 709/242

(58) Field of Classification Search ......... 370/389–392, 370/238, 237, 230, 386, 252; 709/238–242, 709/105; 711/216
See application file for complete search history.

(56) References Cited

U.S. PATENT DOCUMENTS

| | | | | |
|---|---|---|---|---|
| 5,841,775 | A | 11/1998 | Huang | 370/422 |
| 6,185,619 | B1 | 2/2001 | Joffe et al. | 709/229 |
| 6,351,775 | B1 | 2/2002 | Yu | 709/238 |
| 6,363,077 | B1 | 3/2002 | Wong et al. | 370/422 |
| 6,400,722 | B1 | 6/2002 | Chuah et al. | 370/401 |
| 6,473,403 | B1 | 10/2002 | Bare | 370/236 |
| 6,493,341 | B1 | 12/2002 | Datta et al. | 370/392 |
| 6,567,377 | B1 | 5/2003 | Vepa et al. | 370/230 |

(Continued)

OTHER PUBLICATIONS

"Cisco Express Forwarding Feature Module", available at http://www.cisco.com/univercd/cc/td/doc/product/software/ios112/ios112p/gsr/cef.htm, on Sep. 7, 2000 or earlier, 31 pages.

(Continued)

*Primary Examiner*—John Pezzlo
(74) *Attorney, Agent, or Firm*—Cindy Kaplan

(57) ABSTRACT

Systems and methods for implementing per-session load balancing of packets that increase traffic sharing and reduce systematic unequal distribution of traffic are provided by virtue of one embodiment of the present invention. A method for operating a selected router is provided that uses a load balancing algorithm that is configured to de-correlate distribution of sessions among the active paths at the selected router relative to distributions of sessions of other algorithms at other routers of said network. Packets arriving at the selected router are assigned to an output path according to the load balancing algorithm. A method of routing a packet received at a router having an associated identifier is provided. The source address and a destination address of the packet are obtained. An output path is selected according to a load balancing algorithm that uses the associated identifier, the source address, and the destination address as inputs, and the packet is routed to the output interface associated with the selected output path. A look-up table that is configured using the identifier can be used in selecting the output path. A router storing an identifier assigned to the router is provided; the identifier is used in determining per-session routing of incoming packets.

17 Claims, 15 Drawing Sheets

U.S. PATENT DOCUMENTS

| | | |
|---|---|---|
| 6,618,761 B2 | 9/2003 | Munger et al. ............... 709/241 |
| 6,628,655 B1 * | 9/2003 | Fieschi et al. ............... 370/389 |
| 6,650,621 B1 | 11/2003 | Maki-Kullas ............... 370/238 |
| 6,680,947 B1 | 1/2004 | Denecheau et al. ......... 370/396 |
| 6,697,333 B1 | 2/2004 | Bawa et al. ................. 370/238 |
| 6,948,074 B1 | 9/2005 | Borella et al. ................. 726/14 |
| 2005/0172018 A1 * | 8/2005 | Devine et al. ............... 709/223 |

OTHER PUBLICATIONS

"Performance of Hash-Based Schemes for Internet Load Balancing", available at http://www.cs.berkeley.edu/~shelleyz/loadbalancing.htm, Apr. 20, 2000, 3 pages.

* cited by examiner

SAMPLE HASH BUCKET SETUP

Hash Bin - Equal Load Balancing

| Npath | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 2 | 0 | 1 | 0 | 1 | 0 | 1 | 0 | 1 | 0 | 1 | 0 | 1 | 0 | 1 | 0 | 1 |
| 3 | 0 | 1 | 2 | 0 | 1 | 2 | 0 | 1 | 2 | 0 | 1 | 2 | 0 | 1 | 2 | x |
| 4 | 0 | 1 | 2 | 3 | 0 | 1 | 2 | 3 | 0 | 1 | 2 | 3 | 0 | 1 | 2 | 3 |
| 5 | 0 | 1 | 2 | 3 | 4 | 0 | 1 | 2 | 3 | 4 | 0 | 1 | 2 | 3 | 4 | x |
| 6 | 0 | 1 | 2 | 3 | 4 | 5 | 0 | 1 | 2 | 3 | 4 | 5 | x | x | x | x |

For the case of unequal load balancing, paths can be assigned to the hash bin taking account of the weightings. For example, for Npath=2, using one path twice as much as another, using 16 bins, the bins can filled in as {0,0,1,0,0,1,0,0,1,0,0,1,0,0,1,0}. This is not exact but matches the weights closely. Alternatively N_bin can be set to 15 and the bins filled in for example as {0,0,1,0,0,1,0,0,1,0,0,1,0,0,1}.

*FIG. 3*

INITIAL HASH TABLE

| Entry | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 |
| 1 | 0 | 0 | 0 | 0 | 0 | 0 | 0 | 0 | 0 | 0 | 0 | 0 | 0 | 0 | 0 | 0 |
| 2 | 0 | 1 | 1 | 2 | 2 | 2 | 2 | 2 | 2 | 2 | 2 | 2 | 2 | 2 | 2 | 2 |
| 3 | 0 | 0 | 2 | 3 | 3 | 3 | 3 | 3 | 3 | 3 | 3 | 3 | 3 | 3 | 3 | 3 |
| 4 | 0 | 1 | 0 | 0 | 3 | 4 | 4 | 4 | 4 | 4 | 4 | 4 | 4 | 4 | 4 | 4 |
| 5 | 0 | 0 | 1 | 1 | 4 | 5 | 5 | 5 | 5 | 5 | 5 | 5 | 5 | 5 | 5 | 5 |
| 6 | 0 | 1 | 2 | 2 | 0 | 0 | 6 | 6 | 6 | 6 | 6 | 6 | 6 | 6 | 6 | 6 |
| ... |   |   |   |   |   |   |   |   |   |   |   |   |   |   |   |   |
| 65535 | 0 | 1 | 0 | 3 | 0 | 3 | 1 | 7 | 6 | 5 | 8 | 3 | 2 | 1 | 0 | 16 |

Each box is 4-bits of a 64-bit entry

*FIG. 11*

| Table of Shifts | |
|---|---|
| index | shift value |
| 1 | 0 |
| 2 | 4 |
| 3 | 8 |
| 4 | 12 |
| 5 | 16 |
| 6 | 20 |
| 7 | 24 |
| 8 | 28 |
| 9 | 32 |
| 10 | 36 |
| 11 | 40 |
| 12 | 44 |
| 13 | 48 |
| 14 | 52 |
| 15 | 56 |
| 16 | 60 |

*FIG. 12A*

| Table of Shifts | |
|---|---|
| index | shift value |
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |
| 12 | 4 |
| 13 | 0 |
| 14 | 0 |
| 15 | 8 |
| 16 | 12 |

*FIG. 12B*

METHOD AND APPARATUS FOR PER SESSION LOAD BALANCING WITH IMPROVED LOAD SHARING IN A PACKET SWITCHED NETWORK

RELATED APPLICATION

This patent application is a divisional of U.S. patent application Ser. No. 11/242,517, filed Oct. 3, 2005, which is a continuation of U.S. patent application Ser. No. 09/727,098, filed Nov. 29, 2000 (U.S. Pat. No. 6,980,521), which are incorporated herein by reference in their entirety.

BACKGROUND OF THE INVENTION

The present invention relates to routing in a packet switched network. In particular, it relates to methods of performing session load balancing and reducing polarization effects. In a packet switched network, each incoming packet at a router is sent to an output path, with the choice of output path made based on information at the router. (Where a packet has multiple destinations, it can be routed to multiple output paths.) A divergent network is one in which there are multiple paths going through different routers for at least one source-destination pair.

A packet is said to belong to a session. A session is a unidirectional end-to-end IP communication between two IP nodes. All packets in a session have the same source IP address and the same destination IP address.

A destination IP prefix is a leading part of the destination IP address, typically denoting the network address; e.g., IP address 198.01.01.01 can have a destination IP prefix of 198.01. Destination IP prefixes are commonly used to make routing decisions, as known in the art of routing. For example, a table may be maintained showing possible output paths by destination IP prefix.

At a router, an active path for a packet is a valid route to reach the destination address of the packet, that is deemed to have an acceptable cost, as known in the art of routing. A path can be specified in terms of a next-hop IP address and output interface, as known in the art of routing. Load balancing at a router can be thought of as the ability to share the traffic to a destination IP prefix over all active paths. In this application below, the terms "path" and "active path" are used interchangeably.

It is known to achieve near-perfect traffic sharing using per packet routing, where a round-robin based scheme can be used to load balance each packet, and packets in the same session can follow different paths. However, this can result in packet reordering and non-predictive latency for a session, which are undesirable for some applications. Per session load balancing largely eliminates these disadvantages, as known in the art.

In per session load balancing, all packets from a session take the same path from source to destination. Load balancing at a router is the ability to share the traffic to a destination prefix over all the output paths of a router. That is, for a given destination IP address, load sharing can be implemented by having the same number of sessions assigned to each path active for that destination. In a router one or more active paths to a given destination IP prefix may be assigned to an output interface of that router.

In per session load balancing, packets belonging to a session that arrive at a router must consistently be routed to the path. It is known to accomplish this via a hash function that depends only on the source address and destination address for a given number of active paths, and therefore always gives the same result for a given source and destination pair ("(S,D) pair"). The result is called the hash bin or hash result. The hash bin is mapped to a path. In prior art routers, the same hash function is used in each router of a given model and/or manufacturer of router, as described below.

The hash function is designed to evenly distribute the possible (S,D) pairs among the hash bins. For example, typically there can be 16 hash bins with values that are integers between 0 and 15, inclusive. If there are two paths, 8 of the hash bins will be assigned to the first path and 8 hash bins to the second path. This is typically accomplished by assigning even hash bins, i.e. hash bins in the set {0, 2, 4, 6, 8, 10, 12, 14}, to the first path and odd hash bins to the second path, or vice versa. It is known to achieve uneven load sharing by assigning hash bins proportionally; for example, 3:1 load sharing between two paths can be accomplished by assigning 12 hash bins to one path and 4 hash bins to the second path.

Packet routing is by nature decentralized because packets are routed to a next-hop upon arrival at a router. Fast performance is needed because of increasing network traffic and demands for faster response time. Although prior systems are decentralized and fast, a problem is that systems including such routers implementing per session load balancing are observed to exhibit systematically unequal distribution of load sharing. This is a problem among other reasons because links are not used efficiently.

Accordingly, it would be desirable to perform fast session load balancing that reduces systematic load imbalances presently observed. It would further be desirable if the system were decentralized and fine adjustments in load sharing could easily be achieved without reconfiguring the network topology.

SUMMARY OF THE INVENTION

Systems and methods for implementing per-session load balancing of packets that increase traffic sharing and reduce systematic unequal distribution of traffic are provided by virtue of one embodiment of the present invention. A method for operating a selected router is provided that uses a load balancing algorithm that is configured to de-correlate distribution of sessions among the active paths at the selected router relative to distributions of sessions of other algorithms at other routers of said network. Packets arriving at the selected router are assigned to a path according to the load balancing algorithm. A method of selecting a path for a packet received at a router having an associated identifier is provided. The source address and a destination address of the packet are obtained. An output path is selected according to a load balancing algorithm that uses the associated identifier, the source address, and the destination address as inputs, and the packet is sent to the output interface associated with that path. A look-up table that is configured using the identifier can be used in selecting the output path. A router storing an identifier assigned to the router is provided; the identifier is used in determining per-session load balancing of incoming packets.

In one embodiment, a method for operating a selected router of a network, the router performing per-session load balancing, is provided. A load balancing algorithm is configured to reduce correlation of distribution of sessions among the active paths at the selected router relative to distributions of sessions of algorithms at other routers of said network. Packets arriving at the selected router are assigned to a path according to the load balancing algorithm.

In one embodiment, a path is selected for a packet received at a router having an associated identifier. A source address and a destination address of the packet are obtained. An output path is selected according to a load balancing algorithm that uses the associated identifier, the source address, and the destination address as inputs. The packet is sent to the output interface associated with that path. A look-up table that is configured using the associated identifier can be used in the step of selecting the output path.

In another embodiment, a router stores an identifier assigned to the router. The identifier is used to help determine per-session load balancing of incoming packets. In one embodiment, the identifier is derived by seeding a random number generator with the IP address of the router. In another embodiment, the identifier is set by a manufacturer of the router.

In yet another embodiment, an identifier is assigned to a router. An IP address of the router is obtained. A random number generator is seeded with the IP address. An output of the random number generator is assigned as an identifier of the router.

In yet another embodiment, a portion of a packet switched network is configured to reduce routing polarization. At least one router of a plurality of routers of a same model and/or a same manufacturer included in a portion of a network is set to have a different load balancing algorithm than another of the plurality of routers.

A further understanding of the nature and advantages of the inventions herein may be realized by reference to the remaining portions of the specification and the attached drawings.

BRIEF DESCRIPTION OF THE DRAWINGS

FIG. 3 shows a sample hash bucket set-up to map a hash bin to a path for two through six paths.

FIG. 11 is an initial hash table.

FIG. 12A is a sample table of shifts.

FIG. 12B is a sample table of shifts.

DESCRIPTION OF SPECIFIC EMBODIMENTS

Figure 1:
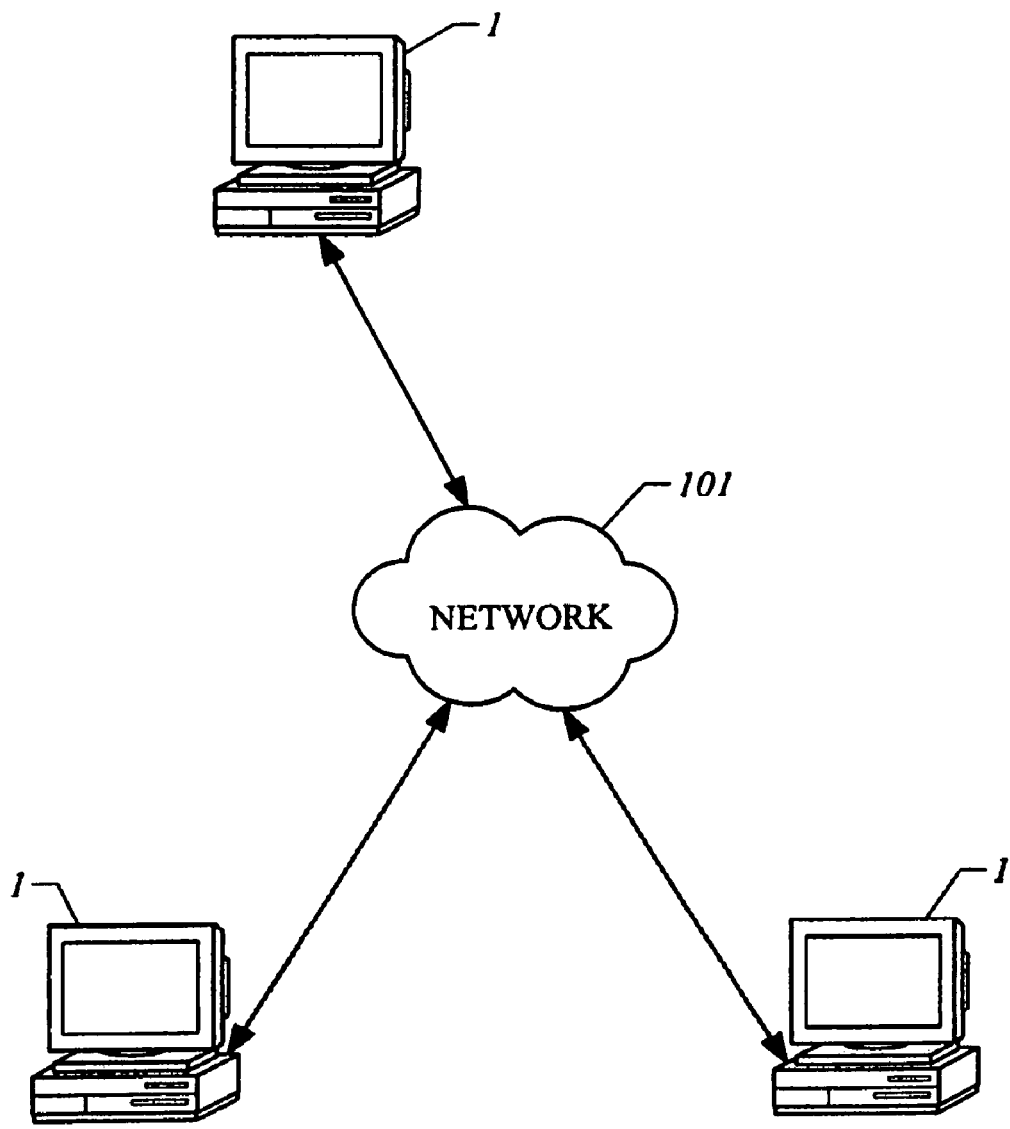
FIG. 1 illustrates a network of multiple computer systems such as the Internet.

Embodiments of the invention are described below with reference to specific processing systems and methods. However, embodiments of the invention can be implemented in various ways. For example, aspects of the invention can be implemented in software or hardware or using special purpose processors or by any other known mechanism. Therefore, the description of the embodiments that follows is for purposes of illustration and not limitation.

Overview

A major problem observed in prior art networks is systematic overuse of some links and under-use of other links. A root cause of this flawed load sharing in prior art systems, revealed by careful examination, is that load balancing of packets at different routers is highly correlated.

The distribution of sessions among output paths at one router is correlated with the distribution of sessions by load balancing algorithms at other routers in prior art networks. In a divergent network, such as the network shown in FIG. 2, sessions that are assigned to the same output path at the first router will tend to be grouped together by the load balancing algorithm at the second router. In the case of two routers having the same number of output paths for a given destination prefix, load balancing of packets with that destination prefix is identical at each router. The specifics of how packets are load balanced in the prior art are described below.

Two load balancing algorithms can be said to be perfectly correlated, if, for a given set of sessions, and an equal number of output paths, the algorithms assign the same sessions to the same output paths. See the discussion of FIG. 2 below.

Correlated load balancing at routers that share traffic reduces load sharing. When load balancing at adjacent routers is completely correlated, no load sharing of traffic arriving from the first router will occur at the second router. All packets arriving at the second router from the first router will arrive at the second router by virtue of the load balancing algorithm at the first router assigning the packets to same output path. At the second router, assuming perfect correlation with the load balancing of the first router, by definition all packets will be assigned to a same output path. There is no load sharing of the traffic from the first router at the second router.

As a concrete illustration, assume a first router has four paths for a certain destination prefix. Assume a certain packet is sent to output path #3 with next hop to a next router. Assume the next router also has four paths. Every packet received from the first router at this next router, load balanced using the same load balancing algorithm, will be sent to output path #3. No load sharing is achieved at the next router: output paths #1, #2, and #4 receive 0% of the traffic at issue.

An example of a hash function such as is used in the prior art to hash the source and destination is shown in the following pseudo-code using conventions of the C programming language. Many such hash function are known in the art.

hash = (dst ^ src) % N_active where ^ is a bitwise-XOR, src indicates the source IP address and dst indicates the destination IP address. The hash is a 16-bit unsigned variable. The result is a value between 0 and (N_active-1), inclusive. N_active is the number of hash bins that are currently active. Referring to FIG. 3, which shows a sample hash bucket setup for up to 16 bins, for npath=2 and 4, N_active is 16; for npath=3 and 5, N_active is 15; and for npath=6, N_active is 12. The result returned is the hash bin that is mapped to a path as known in the art; FIG. 3 shows a table that can be used to do the mapping for two to six paths. The entry in the table is the path to use. For example, for Npath=6 and hash bin 10, path 4 should be used and N_active is 12 since hash buckets 12-15 are not used. For the hash function shown, the hash function plus a mapping as in FIG. 3 make up the load balancing algorithm. Alternatively, N_active can be set to be the number of paths (equivalent to one hash bin per path), in which case the result of the above pseudo-code result can be the index of the output path or can be directly mapped to an output path (in a 1:1 mapping).

As can be seen from examining the pseudo-code and FIG. 3, such a hash function uses as inputs only the source address, destination address, and the number of hash bins that are currently active. The number of hash bins that are currently active depends on the number of paths. For two routers having the same number of paths, the hash function depends only on the source address and the destination address.

Another way of understanding the problem is that prior art routers use a hash function that is designed to uniformly distribute the possible source-destination pairs among the hash bins (put an equal number of (S, D) pairs into each hash bin). For a large sample of random traffic, this will achieve load sharing. However, once a stream of traffic passes through a load balancing algorithm and is divided into sub-streams, each of the sub-streams is not random with respect to the load balancing algorithm, because the value of the load balancing algorithm is the basis on which packets have been assigned to each sub-stream. For example, all the traffic that is assigned to hash bin 4 is in the same sub-stream. We say the traffic is polarized with respect to the load balancing algorithm. The load balancing algorithm will not distribute such traffic evenly among paths. Polarization results in unequal load sharing when such traffic again passes through a router employing the original load balancing algorithm, or through a load balancing algorithm that distributes traffic in a way that is correlated with distributions of the original load balancing algorithm.

In the prior art, although routers can have different numbers of paths and different weighting schemes that introduce some variation in the load balancing algorithms, load balancing algorithms at routers of a same model and/or manufacturer remain highly correlated because they use the same hash function and so bin sessions together in a similar way. Traffic that has passed through one load balancing algorithm is wholly or partially polarized for another load balancing algorithm, and imperfect load sharing results.

In an actual network, routers typically have more than one input interface and various numbers of output interfaces, there is traffic for multiple destination addresses covering multiple destination prefixes, and there are complex interconnections among routers. This results in a greater mixture of factors which counterbalance to some degree the polarizing effects of prior art routers.

The present invention provides a method for reducing polarization effects at a router and in a network as described below. In one embodiment, the output path for an incoming packet is selected according to a load balancing algorithm that uses an identifier associated with the router, the source address and the destination address of the packet as inputs. In this way, the load balancing algorithm can vary from router to router and de-correlation of load balancing between routers in the system can be achieved.

DETAILED DESCRIPTION

FIG. 1 shows a schematic drawing of a network of multiple computer systems. A network 101 provides communication between multiple computer systems 1. In an embodiment of the invention, such multiple computer systems 1 can act as a computer sending or receiving messages.

Figure 2:
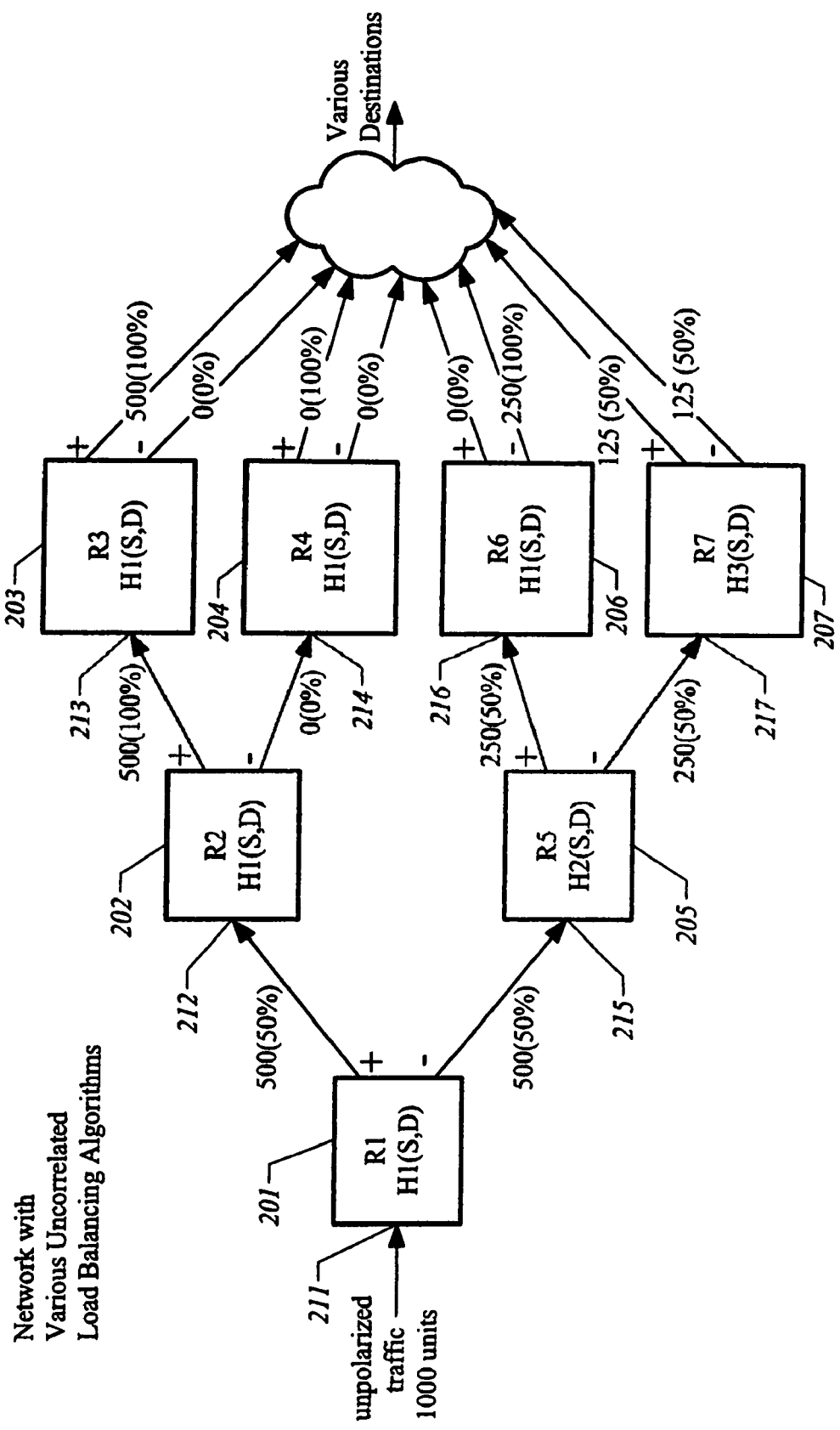
FIG. 2 shows a network including an embodiment of the invention.

FIG. 2 shows a network including an embodiment of the invention. The network achieves per session load balancing. FIG. 2 includes routers R1-R7 201-207. Each router has one input interface 211-217. Each of the routers has two output interfaces. Each output interface has one active output path, which is denoted for reference purposes as "+" for the interface nearer the top of FIG. 2 and "−" for the interface nearer the bottom of FIG. 2.

Analyzing the traffic flow through routers R1 to R4 201-204 illustrates the polarization effect. Each router R1 to R4 201-204 has the same load balancing algorithm H1(S,D). H1 takes as input a source address and a destination address, hashes them, and gives an integer result (hash bin); the hash function can be the one shown in pseudo-code above for example. For example, there can be hash bins 0,1,2,3,4,5,6,7. Each hash bin is mapped to either "+" or "−", and traffic is directly accordingly. For example, bins 0, 2, 4, and 6 can be mapped to "+" and odd bins 1, 3, 5, and 7 to "−" for equal load sharing. At R1 traffic mapped to a "+" is sent to R2: R2 receives traffic polarized in the "+" direction. At R2 this traffic goes through H1 with the same "+" result and is sent to the "+" output interface. There is no sharing of the load at R2. Similarly, all traffic at R3 and R4 is routed to the "+" path.

In the portion of the network including R1, R5, R6 and R7 improved load sharing is achieved. R1 sends the traffic having a "−" result to R5. R5 has a load balancing algorithm H2(S,D) that has results that are uncorrelated with the results of H1(S, D) and that is designed for equal load balancing. That is, the traffic arriving at R5 from R1 is not polarized with regard to H2. Consequently, H2 splits the traffic evenly between the "+" and "−" paths. Similarly, at R7 the load balancing algorithm H3 has results that are uncorrelated with both the results of H1 as well as the results of H2, also shares traffic evenly between its two output paths. Load sharing is achieved at each of R1, R5, and R7.

However, router R6 uses the load balancing algorithm H1. Because all the traffic into R5 is polarized as "−" by H1, the subset of that traffic sent to R6 is also polarized as "−" with regard to H1. So at R6 where load balancing algorithm H1 is used, the traffic from R1 by way of R5 is routed to the "−" path. However, the overall effects of traffic polarization in routers R5-R7 are reduced compared to that in routers R2-R4 by introduction of the different load balancing algorithms H2 and H3.

A load balancing algorithm H2 that has results that are not systematically related to the results of H1 can easily be created if H1 is known by manually choosing H2 to be different from H1. Similarly, H3 can be manually chosen to be different from H1 or H2 if H3 is known. Obviously the problem of manually setting very many load balancing algorithms by referring to other load balancing algorithms in a network rapidly grows unwieldy.

Another way to choose H2 and H3 is to use an appropriate load balancing algorithm—for example the one shown in pseudo code above—with N_active set to be a large number, such as 1000. The mapping from hash bin to path can be done using a table similar to the one shown in FIG. 3, but having 1000 columns corresponding to the 1000 hash bins and having the entries in each row rearranged randomly. Such a system can be implemented but is not preferred.

Figure 4:
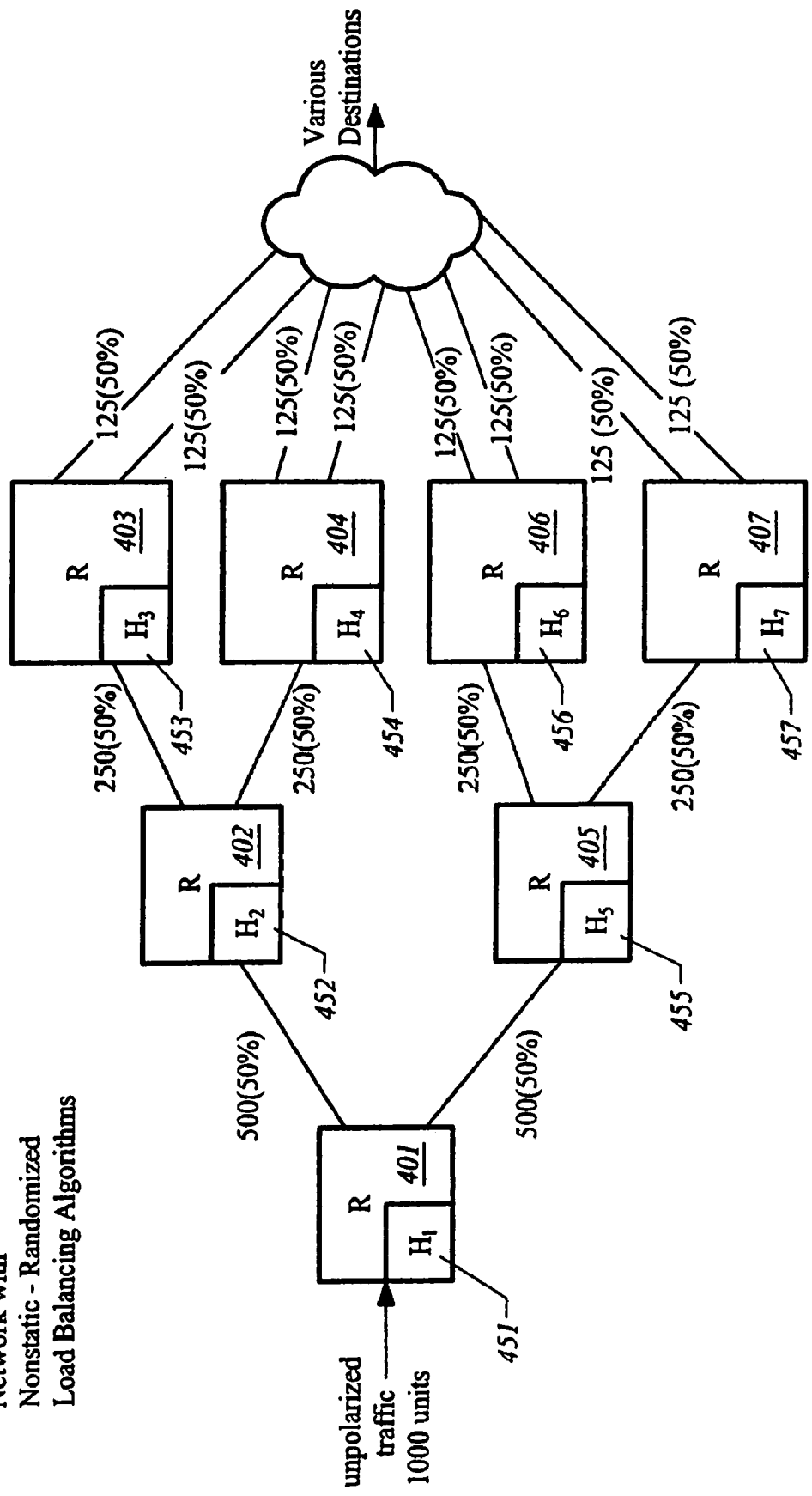
FIG. 4 shows a network including an embodiment of the invention.

FIG. 4 shows a network including an embodiment of the invention. FIG. 4 includes multiple routers R 401-407. Each router has a unique per session load balancing algorithm H1-H7 451-457 whose results are not correlated with those of any other load balancing algorithm in the network. Therefore incoming traffic at a given router is not polarized with respect to the router's load balancing algorithm. In the network shown, per-session load sharing is achieved.

It is cumbersome to assign a different hash function to each router by checking the hash functions at all other routers and choosing one that is different from, and preferably has results that are uncorrelated with, those of existing hash functions in a network. In a preferred embodiment, a load balancing algorithm is used that includes an input parameter that is changed from router to router. In a preferred embodiment, the load balancing algorithm is designed so that the input parameter has the effect of ensuring that the load balancing algorithms employed in the network are not correlated. In a preferred embodiment, the load balancing algorithm is adjusted by choosing a different value for the input parameter if it is found that the load balancing algorithm is not performing well.

A convenient and manageable way to include multiple load balancing algorithms at routers in a network is to use a base load balancing algorithm that is dependent on the source address, destination address, and a third parameter that we call the router identifier ("identifier"). Each router is assigned an identifier which in a preferred embodiment is unique in the network or nearly unique in the network. The identifier causes the load balancing algorithm results to vary from router to router. The base load balancing algorithm and identifier can be selected so that load balancing at a router is not correlated with load balancing at other routers in a network. Details are described below.

Figure 5:
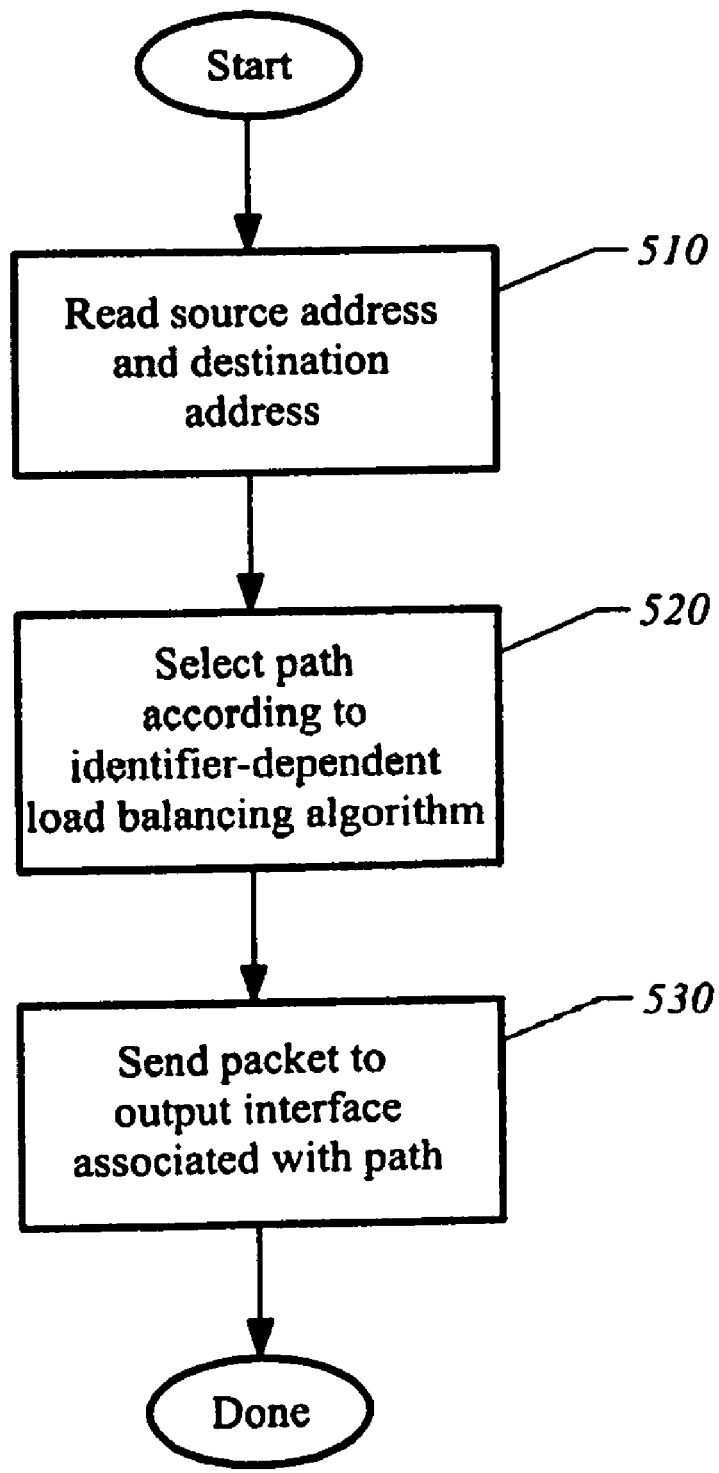
FIG. 5 is a process flow diagram illustrating load balancing according to an embodiment of the invention.

FIG. 5 is a process flow diagram of load balancing a packet according to a preferred embodiment of the invention. A packet is received at a router (not shown). At a step 510 the source address and destination address, which are typically the IP addresses, are read. At a step 520 a path is selected according to an identifier-dependent load balancing algorithm at the router, using the source address and destination address. At a step 530 the packet is sent to an output interface associated with the selected path.

Figure 8:
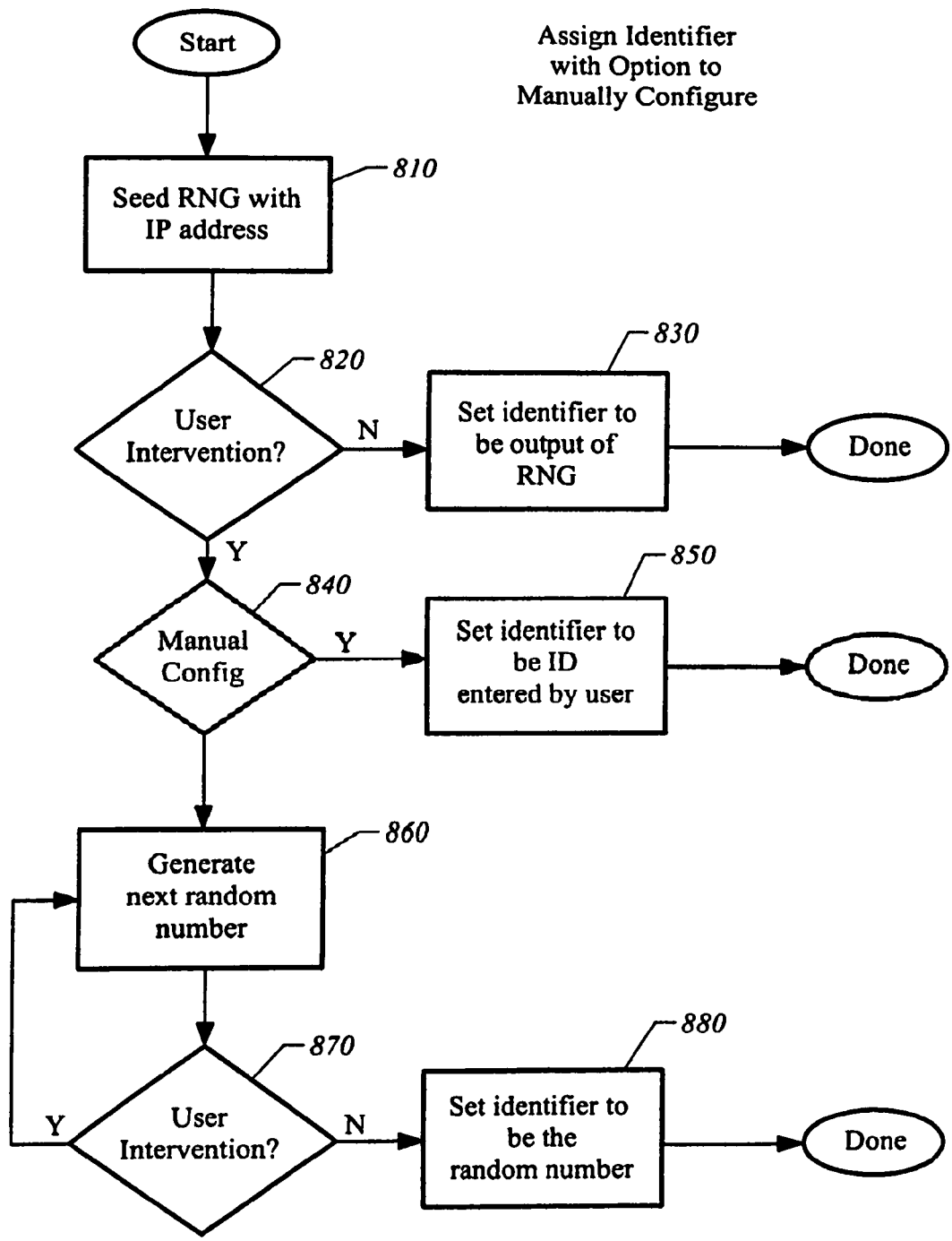
FIG. 8 is a process flow diagram of assigning an identifier to a router with option to manually configure.

In a preferred embodiment, the identifier-dependent load balancing algorithm assigns sessions to paths in a manner that is not systematically related to the distribution of sessions of other load balancing algorithms in the network. It is beneficial for the load balancing by the identifier-dependent load balancing algorithm at the router to be uncorrelated or weakly correlated with load balancing of load balancing algorithms that are used in nearby routers, because traffic is likely to flow from and to the router and nearby routers. The routers can be manually tuned, for example as described below with reference to FIG. 8, when their load balancing performance is sub-par.

An example identifier-dependent base hash function for up to N_active bins follows in pseudo-code using conventions of the C programming language:

lhash = (dst ^ src ^ ident);
lhash = lhash ^ (lhash >>16);
lhash = lhash ^ (lhash >>8);
lhash = lhash ^ (lhash >>4);
return (lhash % N_active);

where ^ is a bitwise-XOR, >> indicates a right-bitshift, src indicates the source IP address and dst indicates the destination IP address. The symbol "%" indicates a modulo operator. The variable ident indicates the router's identifier and N_active is the number of hash bins that are active. The result is the hash bin which then can be mapped onto a path as known in the art. The variable lhash is a 32-bit unsigned variable.

Figure 6:
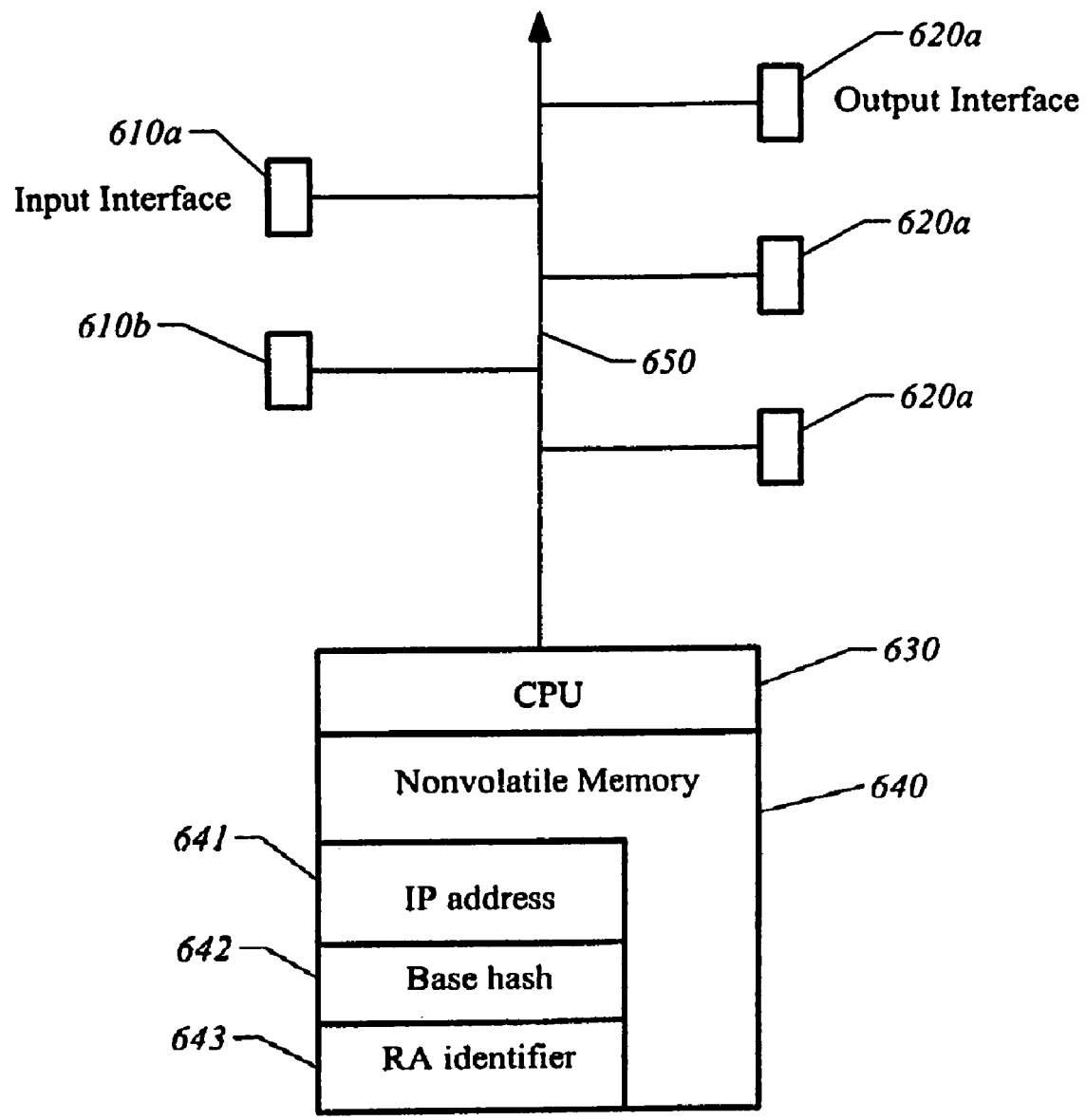
FIG. 6 is a schematic diagram of a router according to an embodiment of the invention.

The base hash function is generally stored in non-volatile memory in the router. FIG. 6 shows a router according to an embodiment of the invention. The router includes input interfaces 610a-b and output interfaces 620a-620c which is coupled via a bus 650 to a central processing unit 630 which includes non-volatile memory 640. Non-volatile memory 640 includes the identifier 643, a base hash algorithm 642, and IP address of the router 641. The router shown is but an example router and other router architectures exist on which the present invention can be implemented, including any router that load balances packets using a per session routing algorithm.

The base hash function shown above is but an example base hash function.

Figure 7:
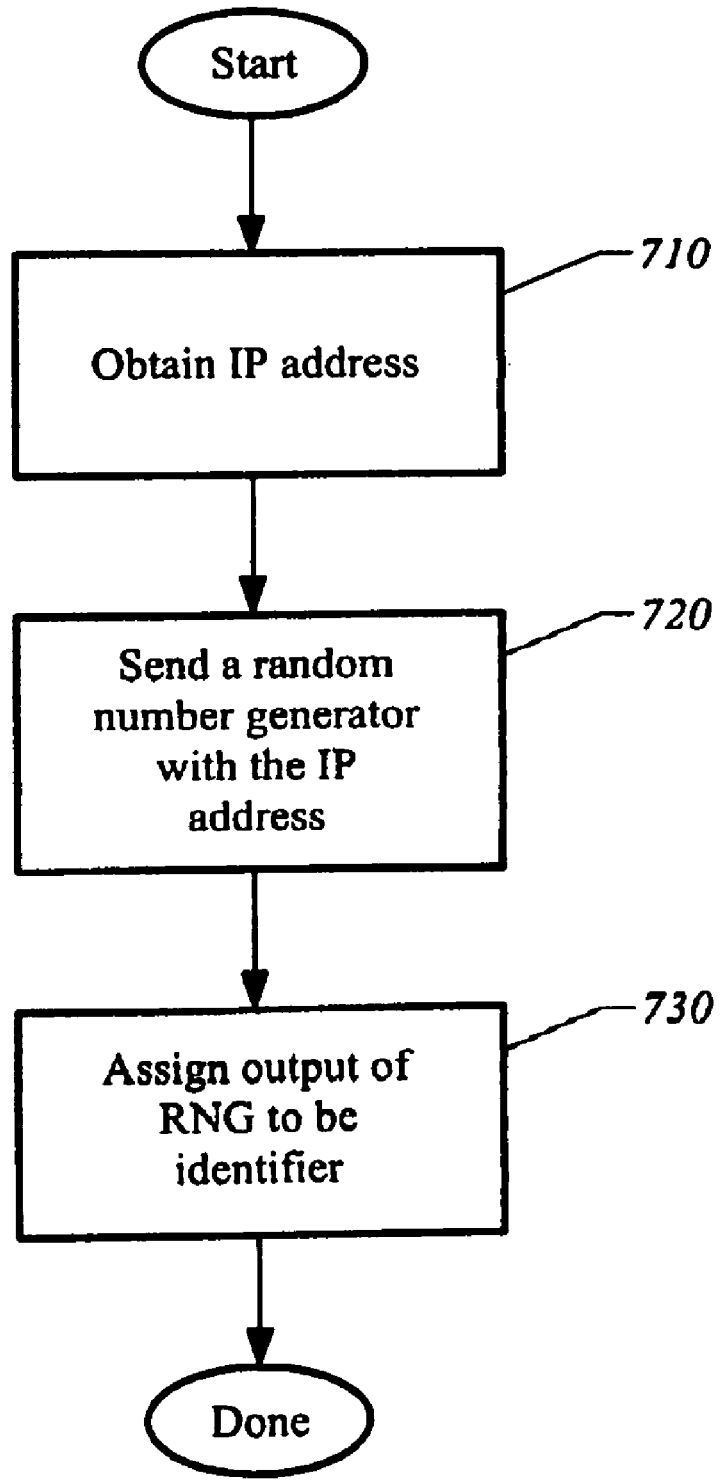
FIG. 7 is a process flow diagram of assigning an identifier to a router.

FIG. 7 is a process flow diagram for assigning an identifier to a router. At a step 710 the IP address of the router is obtained, which can be done by reading it from memory or by any other known means. At a step 720 a random number generator is seeded with the IP address. It can be seeded with the IP address, for example by interpreting it as a 32-bit integer, or by any other transformation of the IP address into a seed. The random number generator (not shown in FIG. 6) can be included in the memory 640 at a manufacture time, can be software that is loaded at a time of putting the router into service, or can be provided by any other known methods. At a step 730 the first random number to be generated is assigned to be the identifier, and in a preferred embodiment is written into memory 640. Because the IP address is fixed, the identifier can be recovered after failure or restart by repeating the process shown.

Alternately, the IP address, transformed into a number for example by interpreting it as a 32-bit integer, can be used as the identifier. However, interconnected devices tend to have similar IP addresses, and so the hash functions generated are strongly correlated. Such correlated hash functions improve load sharing somewhat; however, having a hash function that is uncorrelated or weakly correlated with nearby hash functions is preferred.

Alternately, identifiers can be assigned at a time of manufacture. For example, a manufacture can generate a sequence of random numbers and assign each router one of the numbers, for example by writing it into memory or setting a hardware configuration or including written documentation with the router. A manufacturer can alternately assign serial numbers to each router.

Alternatively, a centralized system can be used to assign an identifier at a set-up time or reboot time of a router. For example a centralized system can provide the next random number in a sequence to a requesting router. (Also for example, a centralized system can have a plurality of different base hash functions and can select a base hash function by, e.g., random selection or by choosing one different from the base hash functions at adjacent routers.)

Alternatively, a router can communicate with each adjacent (next-hop) router and can choose an identifier that is different from each of them. (Also for example, if each router has a plurality of base hash functions to select from it can alternatively communicate with adjacent routers and select a base hash function that is different from the base hash functions at adjacent routers. The base hash function can be one that hashes the source and destination addresses but does not include an identifier parameter, or can be one that includes an identifier parameter.)

Tuning of a router can be accomplished by reconfiguring the router. If it is desirable to reconfigure the router, it can be accomplished as shown in the process flow diagram FIG. 8 which shows a process to assign an identifier with an option to manually configure. A random number generator is seeded with the IP address of the router at a step 810. At a decision step 820 it is decided whether user intervention is desired. User invention is usually not desired, but can be desired if previous load balancing performance of the router has been sub-par. If user intervention is not desired, the identifier is set to the first random number at a step 830. If user invention is desired, it is determined whether the user desires to configure the identifier manually, and if so, the process proceeds to a step 850 where the user enters the identifier. If user intervention is not required, the next random number in the series is generated at a step 860. The user is again queried whether he wishes to intervene at a step 870, and if not, the ID is set to be this second random number at a step 880. If the user wishes to intervene at step 870, the process proceeds along a YES path to step 860 and another random number is generated and the process continues to step 870 until the result of decision step 870 is NO user intervention, at which time the process proceeds to step 880 and the ID is set to the current random number.

Similarly, if multiple base hashing functions are available, then the router can be reconfigured to use a different base hash function.

Figure 9:
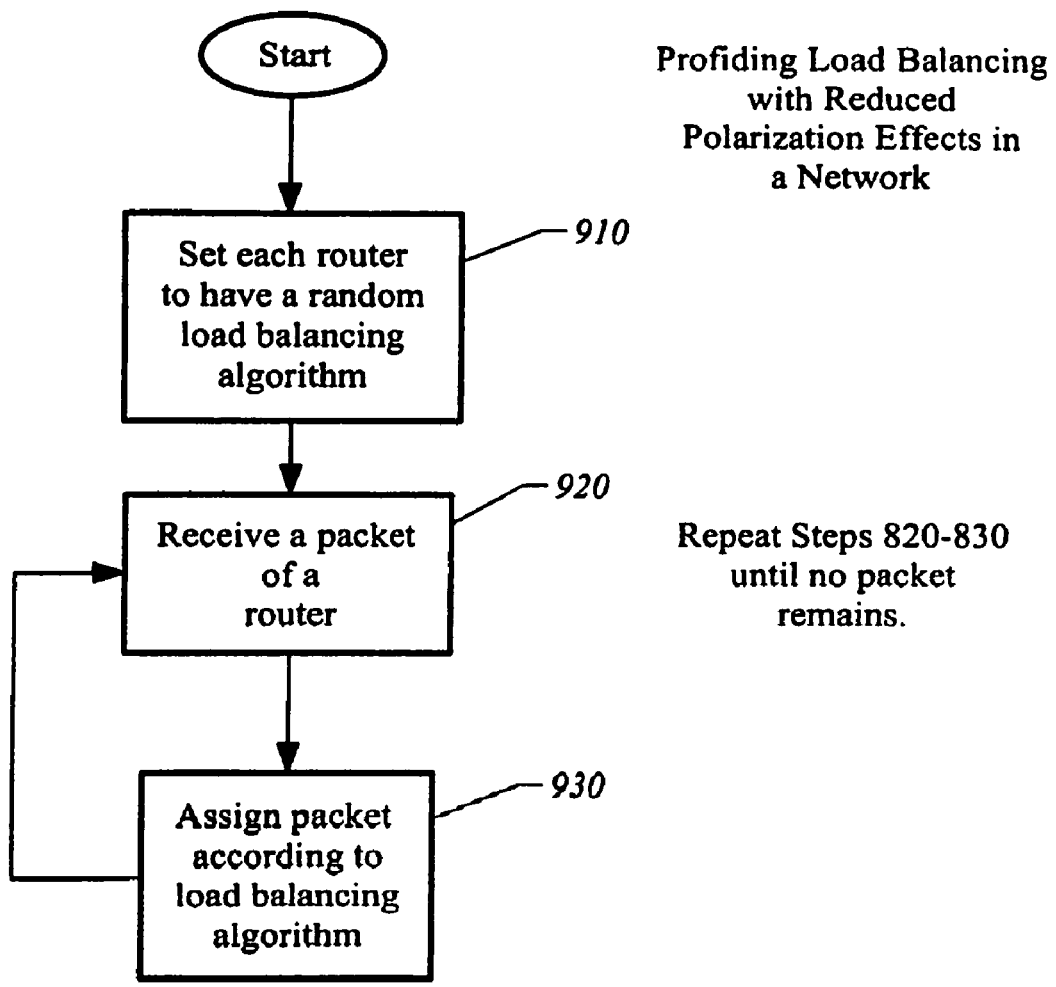
FIG. 9 is a process flow diagram of providing non-polarized load balancing throughout a network.

FIG. 9 is a process flow diagram for providing load balancing with reduced polarization in a network in a preferred embodiment. At a step 910 each router is set to have a load balancing algorithm that produces load balancing where the distribution of source destination pairs is randomly set; preferably this is accomplished by using a load balancing algorithm that includes an identifier parameter, and randomly selecting a value for the identifier, such as described above. This can be achieved, for example, by using the process of FIG. 7 to assign an identifier and then using the identifier-dependent hash function shown above together with a mapping to a path. At a step 920 a packet is received at a router, and at a step 930 the packet is load balanced according to the load balancing algorithm at the router. Steps 920-930 are repeated until no packet remains unrouted at any router in the network.

It is important to note that alternatively, at a step 910 the load balancing algorithm can be configured to load balance in a manner that is de-correlated with routing at other routers in a network. In a preferred embodiment, this is done as described above by using a random value as an input parameter to a load balancing algorithm. Alternatively a load balancing algorithm can be chosen randomly from a very large selection of load balancing algorithms. Choosing randomly has the benefit that the load balancing algorithm can be configured without reference to other routers in the network. However, in an alternative embodiment where the load balancing algorithms at other routers are known, such as other nearby routers, the load balancing algorithm can specifically be chosen so that it load balances in a way that is not well correlated or is uncorrelated with the load balancing at other routers.

Figure 10:
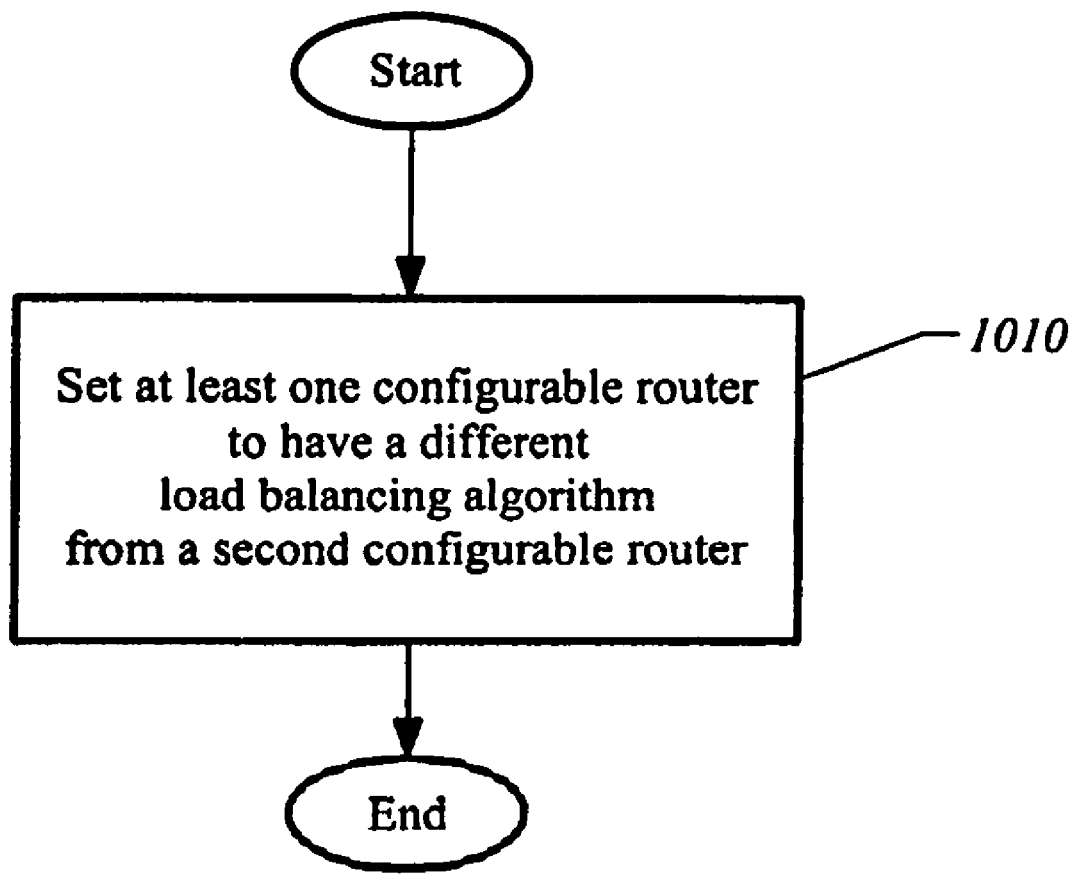
FIG. 10 is a process flow diagram of configuring a plurality of configurable routers.

FIG. 10 is a process flow diagram for configuring a plurality of routers to reduce polarization. At a step 1010 at least one configurable router is set to have a different load balancing algorithm from a second configurable router.

An alternate and fast way to implement a hash function and mapping including a randomizing factor (such as the identifier-dependent load balancing algorithm) is to use a randomized lookup table. Such a randomized lookup table is one example of an identifier-dependent load balancing algorithm. This can eliminate the use of multiply, modulo (which uses a divide operation), or other computationally expensive operations and provide better performance.

An example load balancing algorithm that can be used is shown here in pseudo-code using conventions of the C programming language:
    hash =dst ^ src;
    return ((hash_table[hash] >> hash_table_shifts[N_active]) & 0xf);
    where hash is a 16-bit unsigned variable. 0xf is a hexadecimal number per standard C programming language conventions and is the number 15 which is $(2^4-1)$ and can be represented by four bits that all are on; performing the "&" operator between a number and 0xf has the effect of obtaining the four least significant bits of the number. Hash_table and hash_table_shifts are arrays, explained further next. In one embodiment, hash_table is a $2^{16}$ (65,536) entry table, directly indexed by the result of the hash. Hash_table_shifts is an array containing the shifts necessary to obtain the 4-bits corresponding to the required N_active value.

An initial hash table is shown in FIG. 11. It has $2^{16}$ rows in one embodiment. This is an arbitrary number, and it can be larger or smaller. To randomize the table, the rows are rearranged in a random order (with entries in a row preserved). Each entry is 64-bits, which comprises 16 groups of 4 bits each, one group for each valid value of N_active (number of active hash bins), which in a preferred embodiment can be members of the set of integers from 1 to 16. For ease of reading, in FIG. 11 each group is shown in a separate box, so that each time 1 appears it represents the four bits 0001, and each time 2 appears it represents the four bits 0010, and 3 represents 0011, etc. as known in the art.

Each group has a vertical column in the hash_table, and the values in that column represent the result of "entry" % "group number", where % represents the modulo operator. For example, looking at the last row, entry 65,535, the right most value (group number 1) is 0, because 65535 modulo 1 is 0. The value second to the right (group number 2) is 1, because 65535 modulo 2 is 1 (i.e. 65535 divided by 2 leaves a remainder of 1). The value third to the right (group number 3) is 0, because 65535 modulo 3 is 0 (i.e. 65535 divided by 3 leaves a remainder of 0).

The sample array hash_table_shifts shown in FIG. 12A comprises 16 entries, which are the shifts necessary to obtain the 4-bits corresponding to the relevant 4 bits of the 64-bit entry in hash_table, for the hash bin in question.

In one embodiment, a memory saving can be achieved by modifying the hash table, such as the one shown in FIG. 11, to remove values that are not used. Specifically, some values of N_active may not be used in a given router. If for any reason a value of N_active will not be needed, columns corresponding to these values can be removed thereby saving memory space. For example, if a router only uses values for N_active of 1, 12, 15 or 16, then all but the columns corresponding to these values can be removed, creating a table only 16-bits wide. The hash_table_shifts is modified to provide shifts that correspond to the columns remaining in the hash table. Since the unused N_active values will not be used to index this array, the corresponding entries in the hash_table_shifts can be set to any value. An example hash_table_shifts array for the case where N_active only has values of 1, 12, 15 or 16 is shown in FIG. 12B.

Figure 13:
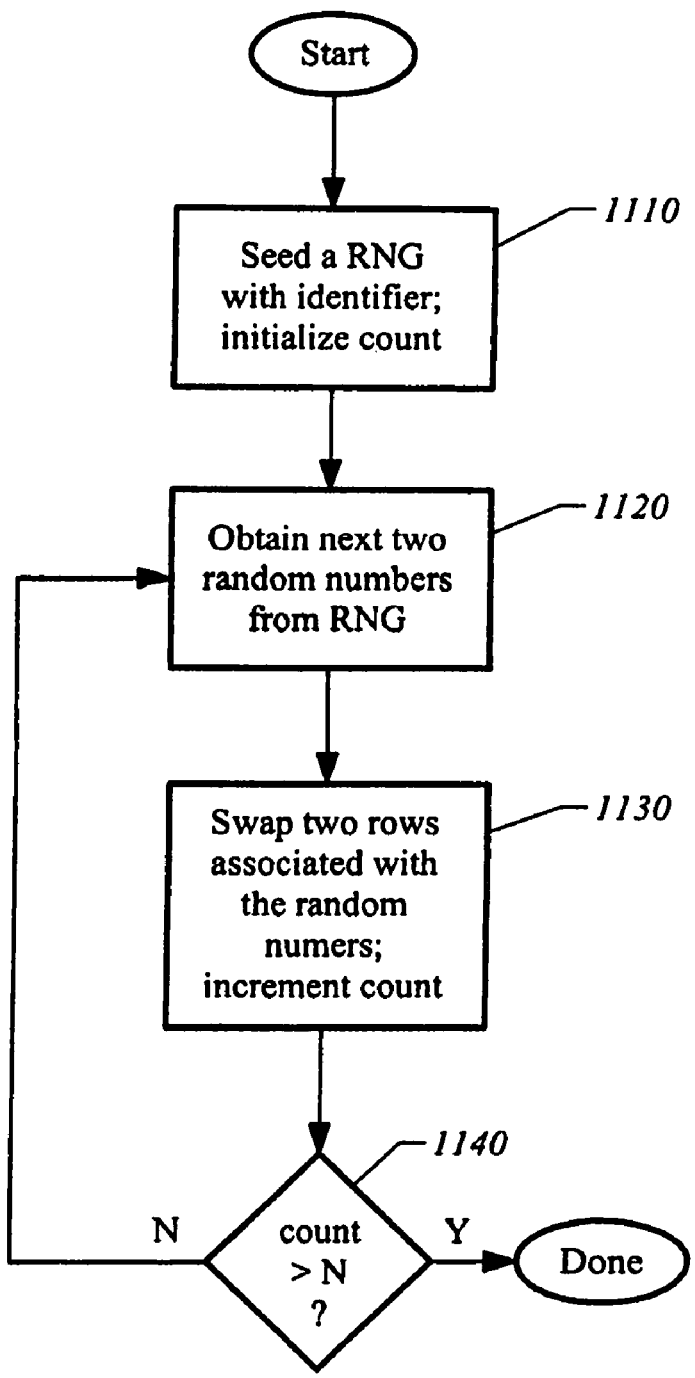
FIG. 13 is a process flow diagram of generating a randomized hash lookup table from an initial hash table.

A process flow diagram for shuffling the rows and generating a randomized hash lookup table is shown in FIG. 13. The operations described are on an initial hash table. At a step 1110 a random number generator is seeded with a unique number, which in a preferred embodiment is the router's identifier. It can alternatively be the IP address of the router. A count variable is initialized also in step 1110. At a step 1120 the next two numbers random numbers are obtained from the random number generator. The two numbers are initially constrained by parameters or mapped to be in the range [0, Nrow], as known in the art of mathematics, where Nrow is $(2^{16}-1)$ for the example being discussed. At a step 1130 the two rows associated with the random numbers are swapped. For example, if the two numbers are numbered 16,543 and 798, then the values in row 16,543 and row 798 are swapped. At a decision step 1140 it is determined whether the desired number of shuffles has been completed (131,070 in one embodiment) and if so, the process completes. If not, the process returns to step 1120 and the next two number in the random number sequence are obtained. Note a random number generator need not be used if an alternate means (such as a database) of random number exists and is accessible. This process flow diagram achieves placing the rows of the initial hash table in a random order.

Both the number of rows as well as the number of shuffles are arbitrary. Either of them can be larger or smaller, and the performance of the network or router observed to determine a minimum number of shuffles or minimum number of rows to obtain the desired degree of load sharing. Since the table is shuffled only at initialization time or when the algorithm or identifier is changed, shuffling a large number of times does not affect routine system performance.

Figure 14:
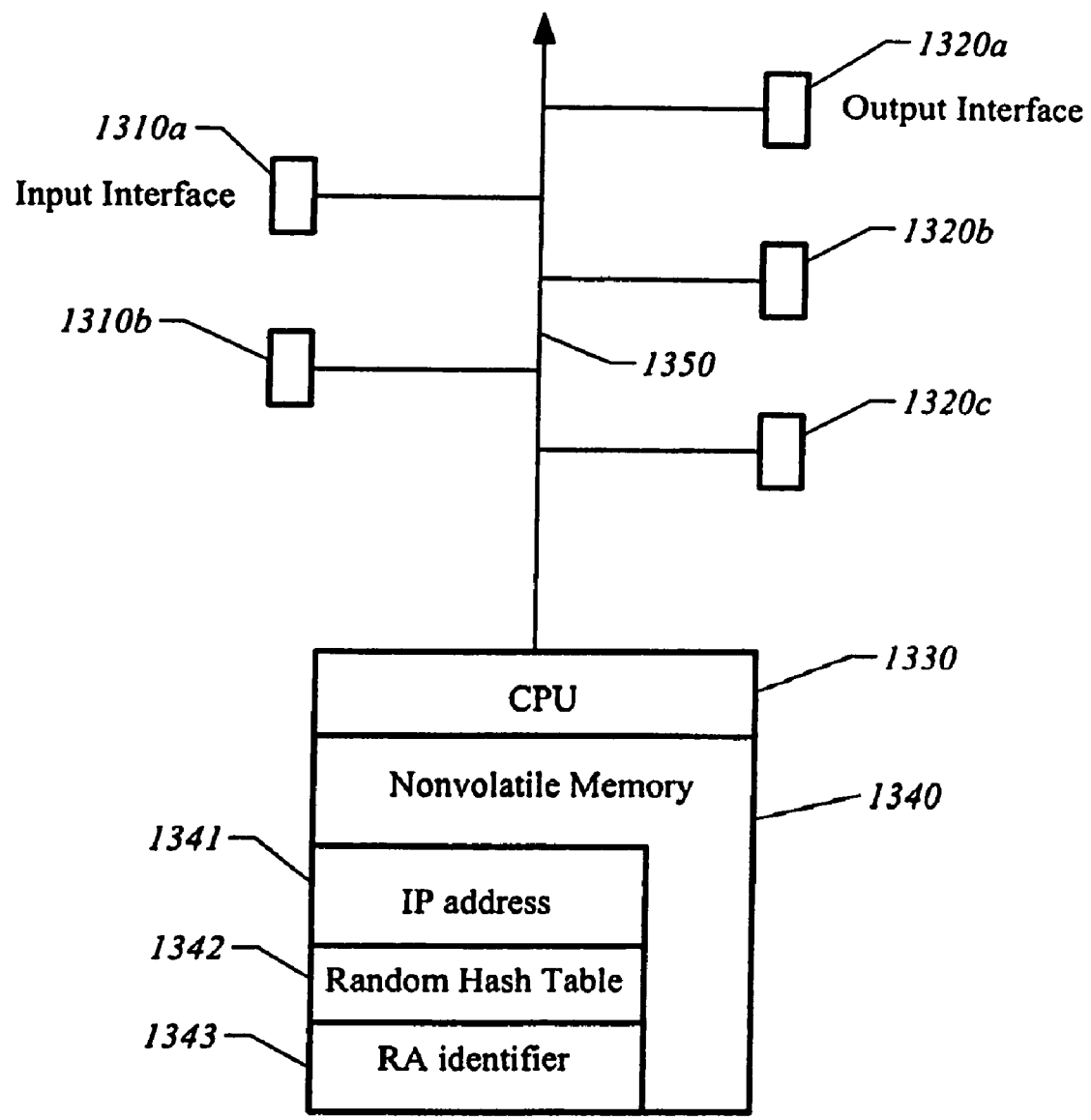
FIG. 14 is a schematic diagram of a router according to an embodiment of the invention.

FIG. 14 shows a router according to an embodiment of the invention. The router includes input interfaces 1310a-b and output interfaces 1320a-1320c which are coupled via a bus 1350 to a central processing unit 1330 that includes non-volatile memory 1340. Non-volatile memory 1340 stores the identifier 1343, a randomized hash lookup table 642, and the IP address of the router 641. The router shown is but an example router and other router architectures exist on which the present invention can be implemented, including any router that load balances packets using a per session load balancing algorithm.

While the above is a complete description of preferred embodiments of the invention, various alternatives, modifications, and equivalents can be used. It should be evident that the invention is equally applicable by making appropriate modifications to the embodiments described above. For example, the flowcharts are exemplary embodiments but steps may be added, deleted, combined, and reordered without departing from the spirit and scope of the invention. Creation of an identifier can be performed at a time of manufacture or upon booting the router. It can be done by generating it from information at the router without referring to any other router, by referring to a central database, randomly, or by any other known means. Therefore, the above description should not be taken as limiting the scope of the invention that is defined by the metes and bounds of the appended claims along with their full scope of equivalents.

The foregoing describes embodiments of an invention that can significantly reduce unbalanced load sharing in a network that includes per-session load balancing. A hash function that can vary from router to router is introduced. Routers of the invention preferably use a randomly chosen identifier that can be generated at the router, without communicating with other routers, to modify the hash function so that load balancing algorithm results from various routers are de-correlated from one another. As in prior art systems, unequal load balancing can be implemented. A network can be fine-tuned by manually configuring a router whose load-sharing performance is considered sub-par. Routers manufactured according to an embodiment of the invention can be placed into service in, and improve performance of, a network using prior art routers.

I claim:

1. An apparatus for configuring a portion of a packet switched network to reduce load balancing polarization comprising:
    a processor; and
    a memory device that stores instructions for execution by the processor, said instructions comprising:
        code that selects a router from a plurality of routers of a same model included in a portion of a network, each of said plurality of routers having a same load balancing algorithm; and
        code that sets said router to have a different load balancing algorithm from another of the plurality of routers.

2. The apparatus of claim 1 wherein each of said routers store an identifier assigned thereto, wherein the identifier is used in determining per-session load balancing of incoming packets.

3. The apparatus of claim 2 wherein the identifier is derived from a second identifier.

4. The apparatus of claim 3 wherein the identifier is derived by seeding a random number generator with the second identifier.

5. The apparatus of claim 3 wherein the second identifier is an IP address of the router.

6. The apparatus of claim 2 wherein the identifier is a random number.

7. An apparatus for configuring a portion of a packet switched network to reduce load balancing polarization comprising:
    a processor; and
    a memory device that stores instructions for execution by the processor, said instructions comprising:
        code that selects a router from a plurality of routers of a same manufacturer included in a portion of a network, each of said plurality of routers having a same load balancing algorithm; and
        code that sets said router to have a different load balancing algorithm from another of the plurality of routers.

8. The apparatus of claim 7 wherein each of said routers store an identifier assigned thereto, wherein the identifier is used in determining per-session load balancing of incoming packets.

9. The apparatus of claim 8 wherein the identifier is derived from a second identifier.

10. The apparatus of claim 9 wherein the identifier is derived by seeding a random number generator with the second identifier.

11. An apparatus for load balancing a packet at a router using per-session load balancing comprising:
    a processor; and
    a memory device that stores instructions for execution by the processor, said instructions comprising:
        code that obtains a source address and a destination address of a packet received at a router having an associated identifier;
        code that selects an output path according to a load balancing algorithm that uses the associated identifier, the source address, and the destination address as inputs, wherein code that selects the output path includes code that uses a look-up table that is configured using the associated identifier, the look-up table being a randomized hash look-up table, wherein the randomized hash lookup table is configured by creating an initial hash table having a plurality of rows, seeding a random number generator with the associated identifier, obtaining a next random number and another next random number from the random number generator, and swapping a row associated with the next random number and a row associated with the another next random number; and
        code that sends the packet to an output interface associated with the selected output path.

12. The apparatus of claim 11 wherein the load balancing algorithm has multiple parameters.

13. The apparatus of claim 11 further comprising means for monitoring the loading balancing of packets for unacceptable performance.

14. An apparatus for operating a selected router of a network, the router performing per-session load balancing where all packets of a session are sent over a same active path, the apparatus comprising:

a processor; and a memory device that stores instructions for execution by the processor, said instructions comprising:

code that configures a per-session load balancing algorithm to reduce correlation of distribution of sessions among the active paths at the selected router relative to distributions of sessions among the active paths of said per-session load balancing algorithm at other routers of said network; and code that assigns packets arriving at said selected router to a path according to said per-session load balancing algorithm.

15. The apparatus of claim 14 wherein the load balancing algorithm has multiple parameters and wherein code that configures a per-session load balancing algorithm comprises:

code that selects a random value; and code that sets one of the multiple parameters of the load balancing algorithm to be the random value.

16. The apparatus of claim 15 further comprising:

code that monitors the load balancing of packets for unacceptable performance; and code that, if there is unacceptable performance, reconfigures the load balancing algorithm by setting said one of the multiple parameters to a different random value.

17. The apparatus of claim 14 further comprising:

code that monitors the load balancing of packets for unacceptable performance; and code that, if there is unacceptable performance, reconfigures the load balancing algorithm by setting said one of the multiple parameters to a unique value.

\* \* \* \* \*